United States Patent Office 3,325,418
Patented June 13, 1967

3,325,418
POLYCHLOROSULFONATED POLYMERS AS VISCOSITY INDEX IMPROVERS AND LUBRICATING OIL DETERGENTS
Frank A. Stuart, Orinda, Calif., assignor to Chevron Research Company, a corporation of Delaware
No Drawing. Filed Sept. 23, 1964, Ser. No. 398,736
8 Claims. (Cl. 252—32.7)

This invention concerns novel high molecular weight aliphatic sulfonamides. More particularly, this invention concerns novel high molecular weight aliphatic polysulfonamides and their use as lubricating oil additives.

In order to obtain the properties necessary for a lubricating oil to satisfy the severe demands of modern engines, numerous additives are added to present-day lubricating oils. The prime objectives of any lubricating oil or additive is to inrease the life and extend the operating period between engine overhauls. For the most part excepting mechanical failures, overhaul is required because of failure of a part of the engine due to wear or the accumulation of deposits. While oxidation inhibitors aid in minimizing the formation of varnish and sludge deposits, it has generally been found necessary to add detergents to the lubricating oil to further prevent deposition. Particularly, in low temperature gasoline engine operation encountered in stop-and-go passenger car service, where fuel oxidation products are the major source of deposits, detergent additives find wide use.

Also, the need that the lubricating oil have reasonable viscosity over a wide range of temperature in order to provide proper lubrication has resulted in adding viscosity index improvers to the lubricating oil. These viscosity index improvers are for the most part high molecular weight polymers such as poly(alkyl methacrylate), polyisobutylene, etc.

It has now been found that viscosity index improvement and detergency can be obtained with polysulfonamide-substituted high molecular weight polyolefins.

The polysulfonamide is prepared from olefins of from 2 to 20 carbon atoms and has a molecular weight in the range of about 200,000 to 1,000,000 (about 15,000 to 70,000 carbon atoms), preferably 200,000–500,000. The carbon to sulfur number ratio in the polymer will generally be from about 100 to 600 carbon atoms per sulfur atom, which means from about 50 to 700 sulfonic groups per molecule. Generally, there will be about from 0 to 2 chlorine atoms per sulfur atom; the presence of the chlorine bonded to carbon neither significantly enhances nor detracts from the desired properties of the polysulfonamides. The amine portion of the sulfonamide group will generally be of from about 2 to 20 carbon atoms, more usually from 2 to 16 carbon atoms and have from 1 to 6 nitrogen atoms. The amine portion may be substituted with a variety of groups containing hetero atoms, such as hydroxyl groups, nitrile groups, etc. Generally, there will be no (0) substituents or from 1 to 3 hydroxyl groups.

The polysulfonamide is readily prepared by chlorosulfonating high molecular weight aliphatic polyolefins to form the polychlorosulfonyl-substituted polyolefin, which may then be reacted with a particular amine. The method of preparing the polysulfonamide polyolefin is not critical to this invention and various means known in the art may be used.

The method of preparation of the polyolefin is also not critical to the invention. Preferably, the polyolefin will be atactic. That is, it will have little, if any, crystallinity or ability to crystallize. Therefore, while some stereoregularity may be present, the significant factor is that the polymer is incapable of crystallizing to a significant degree.

The aliphatic olefin used in the preparation of the polyolefin will generally be from 2 to 20 carbon atoms, more usually of from 3 to 20 carbon atoms. The polymer may be a homopolymer or copolymer, but is preferably a copolymer. Olefins which may be used include ethylene, propylene, butene-1, 4-methylpentene-1, hexene-1, decene-1, octadecene-1, eicosene-1, etc.

Illustrative of polymers which find use are copolymers of propylene and butene, of ethylene and butene, of propylene and 4-methylpentene-1, of butene and 4-methylpentene-1, of cracked wax olefins of from 9 to 20 carbon atoms, of cracked wax olefins of from 6 to 16 carbon atoms, homopolymers of propylene, octene-1, butene-1, isobutylene, etc.

The copolymers may be random or block, either terminal or alternating. Preferred are the random copolymers.

The amine group will generally be of from 2 to 20 carbon atoms and from 1 to 6 nitrogen atoms. The amine may be aliphatic, aromatic or heterocyclic. It is only essential that the amine have at least one amino group which is either primary or secondary, that is, bonded to at least one hydrogen atom. One or more different amines may be used simultaneously; mixture of amines will generally be of the same type, e.g., alkylamine.

Preferred groups of amines include simple primary or secondary monoamines (from 1 to 2 hydrogen atoms bonded to the nitrogen) which have the following formula:

$$R_xNH_{3-x}$$

wherein R is a hydrocarbyl group (an organic radical solely composed of hydrocarbon which may be aliphatic, alicyclic or aromatic or combinations thereof, e.g., aralkyl) of from 2 to 20 carbons and $x$ is an integer of from 1 to 2; and alkylene amines which may be divided into alkylene polyamines and polyalkylene polyamines as one group and piperazine as a second group, wherein these compounds have the following formulae, respectively:

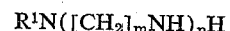
$$R^1N([CH_2]_mNH)_nH$$
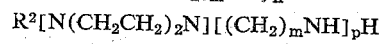
$$R^2[N(CH_2CH_2)_2N][(CH_2)_mNH]_pH$$

wherein $R^1$ is selected from the group consisting of hydrogen and lower alkyl, i.e., alkyl of from 1 to 6 carbon atoms, $R^2$ is selected from the group consisting of hydrogen and lower alkyl, $n$ is an integer of from 2 to 6, $m$ is an integer of from 1 to 5, and $p$ is a cardinal number of from 0 to 1.

Illustrative of the first group of amines (the simple hydrocarbyl monoamines) are n-butylamine, n-laurylamine, decylamine, oleylamine, ethylamine, di-ethylamine, di-n-butylamine, aniline, p-toluidine, cyclohexylamine, tridecylamine, etc.

Illustrative of the alkylene amines are ethylene diamine, diethylenetriamine, triethylenetetramine, tetraethylene pentamine, pentaethylenehexamine, di(triethylene)triamine, hexamethylenediamine, di(pentamethylene)triamine, and N,N-dimethylaminopropylamine, N,N-diethylaminopropylamine, etc.

Illustrative of the piperazine compounds are N-(2-aminoethyl) piperazine, N-methylpiperazine N-ethylpiperazine, and N-(3-aminopropyl)piperazine, etc.

Another group of preferred amines are the hydroxyl substituted lower alkyl primary amines, having from 2 to 6 carbon atoms, from 1 to 3 hydroxyl groups and one primary amino group. Illustrative of this group of amines are ethanolamine, tri(hydroxyethyl)amine, trimethylolmethylamine, etc.

In preparing the polysulfonamide-substituted polyolefins from the polychlorosulfonyl substituted polyolefin, the chlorosulfonyl compound is contacted with the amine in the presence of an inert solvent at a temperature in the range of about 20 to 100° C. for a time sufficient to react almost all or all of the sulfonyl chloride with the amine. Generally, contacting for about 30 minutes to six hours is sufficient. In those instances where a polyamine is used, it is preferable to add the sulfonyl chloride to the solution of the polyamine, so that an excess of the polyamine may be present during the reaction. By this means, crosslinking is minimized, if not completely avoided.

The compounds of this invention can be used with various base oils which find use as lubricating oils, such as naphthenic base, paraffin base and mixed base petroleum lubricating oils; other hydrocarbon lubricants, e.g., alkylene polymers (such as polymers of propylene, butylene, etc., and the mixtures there); alkylene oxide type polymers (e.g., propylene oxide polymers) and derivatives, including alkylene oxide polymers prepared by polymerizing the alkylene oxide in the presence of water or alcohols, e.g., ethyl alcohol; dicarboxylic acid esters (such as those which are prepared by esterifying such dicarboxylic acids as adipic acid, azelaic acid, suberic acid, sebacic acid, alkenyl succinic acid, fumaric acid, maleic acid, etc., with alcohols, such as butyl alcohol, hexyl alcohol, 2-ethylhexyl alcohol, dodecyl alcohol, etc.); liquid esters of acids of phosphorus; alkylbenzenes (e.g., monoalkylbenzene, such as dodecylbenzene, tetradecylbenzene, etc., and dialkylbenzenes, e.g., n-nonyl-2-ethylhexylbenzene); polyphenyls, e.g., biphenyls and terphenyls; alkylbiphenyl ethers; silicon compounds, e.g., tetraethyl silicate, tetraisopropyl silicate, tetra-(4-methyl-2-tetraethyl) silicate, hexyl-(4-methyl-2-pentoxy)-disiloxane, poly(methyl)-siloxane, poly(methyl-phenyl)-siloxane, etc.

The above base oils may be used individually or in combination whenever miscible or made so by the use of mutual solvents.

The above-described sulfonamides of this invention can be used in oils of lubricating viscosity in amounts of from about 0.1% to 80% by weight. When the oil is to be used in an engine, usually the amount will be 0.1 to 10 weight percent, more usually 0.25 to 5 weight percent. However, the excellent solubility of the compounds of this invention in oil permits their formulation as concentrates, which may be diluted prior to use. As concentrates, the amount of the sulfonamides may range from about 10 to 80 weight percent.

Preferably, a zinc O,O-dihydrocarbyl phosphorodithioate is used in the engine oil with the detergents of this invention. (Hydrocarbyl is a monovalent organic radical containing only carbon and hydrogen and includes aliphatic, alicyclic and aromatic radicals and combinations thereof, e.g., aralkyl.) The hydrocarbyl groups are of from 4 to 36 carbon atoms, and about 6 to 50 mM./kg. of the dithiophosphate is used. Preferably, the hydrocarbyl groups are alkyl or alkaryl.

The following examples are offered by way of illustration and not by way of limitation.

*Example 1*

This example illustrates the chlorosulfonation of a polyolefin.

Into a 1 liter flask equipped with a stirrer, a gas inlet tube with fritted glass tip and a gas discharge tube was introduced 50 grams of a copolymer of propene and butene-1 (1:3 molar ratio) in 700 grams of carbon tetrachloride. Near the upper part of the flask was placed a GE "Black Light" circular lamp as a source of actinic radiation. The flask was then immersed in a bath of running tap water.

The system was flushed with nitrogen to remove the oxygen and then chlorine (at a rate of 80 ml. per minute), and sulfur dioxide (at the rate of 800 ml. per minute) were mixed in a glass vessel and then introduced into the reaction flask. When the gas flow started, the "Black Light" was turned on. The progress of the chlorosulfonation was followed by an infra-red spectroscopy, using the 8.6$\mu$ peak.

The polymer was ilosated by precipitation with acetone.

The following table illustrates a number of poly sulfonamide-substituted polyolefins prepared in a similar manner to that described in Example 1, and indicating the results of the viscosity index determination.

TABLE I

| Ex. No. | Polymer [7] Olefins [1] | Polymer [7] Mol Ratio | Wt. percent S | Wt. percent Cl [2] | C/S Ratio [3] | Amine | Viscosity Index | Shear [4] |
|---|---|---|---|---|---|---|---|---|
| II | $C_3/C_4$ | | | | 110/1 | n-Butylamine | 131 | |
| III | $C_3/C_4$ | | 1.63 | | 120/1 | n-Laurylamine | 129 | C 34.2–10–22.6. |
| IV | $C_3/C_4$ | | | | 160/1 | 2-aminoethyl piperazine | 126.5 | |
| V | $C_3/C_4$ | 60/40 | 0.64 | | 350/1 | N-methyl piperazine | 132 | |
| VI | $C_3/C_4$ | 25/75 | | | 300/1 | Tetraethylene pentamine | 128 | |
| VII | $C_3/C_4$ | 25/75 | 0.59 | | 380/1 | Diethylamine | 116 | |
| VIII | $C_3/C_4$ | 25/75 | 0.59 | | 380/1 | N-methyl piperazine | 129 | E 31.4–19–27. |
| IX | $C_3/C_4$ | 25/75 | 0.59 | | 380/1 | 3-(N,N-dimethylamino)propylamine | 129 | |
| X | $C_3/C_4$ | 25/75 | 0.59 | | 380/1 | Trimethylolmethylamine | 137 | |
| XI | $C_3/C_4$ | 60/40 | | | 145/1 | 3-(N,N-dimethylamino)propylamine | 124 | |
| XII | $C_3/C_4$ | 60/40 | | | 145/1 | Aniline | 131 | |
| XIII | $C_3/C_4$ | 25/75 | 0.46 | 1.34 | 450/1 | N-methyl piperazine | 125 | |
| XIV | $C_{9-11}/C_{12-15}/C_{16-20}$ | 30/40/30 | 0.50 | 2.58 | 500/1 | N-laurylamine | 132 | |
| XV | $C_{9-11}/C_{12-15}/C_{16-20}$ | 30/40/30 | 0.50 | 2.58 | 500/1 | N-methylpiperazine | 132 | |
| XVI | $C_{14}$ | | 1.04 | | [5] 220/1 | Diethylamine-di-n-hexylamine (equimolar). | [6] 131 | |
| XVII | $C_{14}$ | | 1.19 | | [5] 190/1 | Diethylamine-di-n-hexylamine (equimolar). | [6] 131 | |

[1] $C_3$—propylene; $C_4$—butene; $C_{9-11}/C_{12-15}/C_{16-20}$—olefins obtained by cracking wax, reported as ranges in mol ratio; $C_{14}$—isobutylene.
[2] Percent Cl—chlorine determined prior to amidation; at least 1 chlorine present per sulfur atom.
[3] C/S Ratio—number of carbon atoms per sulfur atom. Determined by infra-red analysis, using elemental analysis to determine relationship between peak height at 8.6 and number of sulfonyl groups.
[4] Shear—ASTM Vol. 1, page 1160 (1961); for C—Acryloid 763—Sample, Acryloid 710; for E—Acryloid 763—Sample, Acryloid 917. The acryloid polymers are available as standards from Rohm & Haas Company.
[5] Determined from sulfur analysis.
[6] Used SAE 150 N for determination.
[7] The molecular weight of the polymer of Examples I–XV is in the range of 2.5–3.5 × 10⁵; for Examples XVI–XVII about 2.5×10⁵.

A number of the samples prepared above were also tested as detergents. The first test was a modified standard FL-2 test procedure as described in the June 21, 1948 report of the Coordinating Research Council. A standard procedure requires the maintenance of a jacket temperature of 95° F. and a crankcase oil temperature of 155° F. at 2500 r.p.m. and 45 brake horsepower of 40 hours (closely simulating the relatively "cold" engine conditions which are normally experienced in city driving). At the end of each test, the engine is dismantled and the amount of sludge (rating of 0 to 50, no sludge being 50) and clogging of the rings and oil screen (rated from 0 to 100, 0 being no clogging) is determined.

The above test was modified by carrying out the test for 80 hours and periodically raising the oil sump temperature from 165° to 205° F. and the water jacket temperature from 95° to 170° F.

Also used were the L-1 Supplement 1 conditions (MIL-1-2-1048, Supp. 1) as described in Co-ordinating Research Council Handbook, January 1946. The oil samples used a Mid-continent base oil SAE–30 containing in the former test 2.5 percent of a candidate detergent and 15 mM. per kg. of zinc O,O,-di(alkyl) phosphorodithioate (alkyl of from 4 to 6 carbons), and in the latter test .75 weight percent of the candidate detergent and 8 mM. per kg. of the zinc salt.

The following table indicates the results:

TABLE II

| Candidate Detergent | Sludge rating | FL-2—Clogging | | L-I, Supp. I [1]—120 Hours | |
|---|---|---|---|---|---|
| | | Rings | Screen | Grooves | Lands |
| Commercial Detergent | 29 | 86 | 50 | | |
| III | 46.6 | 35 | 1 | | |
| V | 44.2 | 19 | 5 | 2.3-0-0-0 | 10-0-0 |
| XV | 46.8 | 20 | 5 | | |
| XVII | | | | | [2] 90-0-5 |
| Base Oil | | | | 38-10-10-10 | [2] 800-800-800 |

[1] The groove numbers refer to the percentage of deposits in the piston ring grooves; an 0 evaluation being a clean groove; a number 100 being a groove full of deposits. The Lands numbers refer to the piston Lands which are examined visually. To a piston skirt which is completely black is assigned a number of 800; to one which is completely clean is assigned a number of 0; to those intermediate between completely black and completely clean, are assigned numbers intermediate in proportion to the extent and degree of darkening.

[2] Measured under the less severe L–I conditions (MIL-L-2107A) for 60 hours. Two weight percent of the candidate detergent used with 18 mM./kg. of the zinc salt.

It is evident from the above results that the compounds find not only use as good viscosity index improvers, but also as good detergents. In this way, the compositions of this invention not only provide a new material demonstrating superior results, but also combine the attributes of what was previously required of different additives.

As will be evident to those skilled in the art, various modifications on this process can be made or followed, in the light of the foregoing disclosure and discussion, without departing from the spirit or scope of the disclosure or from the scope of the following claims.

I claim:

1. A lubricating oil composition comprising an oil of lubricating viscosity and in sufficient amount to provide viscosity index improvement and detergency a polysulfonamide-substituted polyolefin of from about 200,000 to 1,000,000 molecular weight obtained by reacting a chlorosulfonated polyolefin, derived from aliphatic olefiins of from 2 to 20 carbon atoms, having a carbon to sulfur ratio of from about 100 to 600 and from 0 to 2 chlorine atoms per sulfur atom other than the chlorine of the chlorosulfonyl group, with an amine of from 2 to 20 carbon atoms, from 1 to 6 nitrogen atoms and from 0 to 3 hydroxyl groups, wherein at least about 1 mol of amine will be added per equivalent of chlorosulfonyl.

2. A lubricating oil composition according to claim 1, wherein said aliphatic olefins are from 3 to 20 carbon atoms and said amine is a polyalkylene polyamine.

3. A composition according to claim 1, wherein the said olefins of said polyolefin are propylene and butene.

4. A composition according to claim 1, wherein said olefins of said polyolefin are olefins of from 9 to 20 carbon atoms.

5. A composition according to claim 3, wherein said olefin of said polyolefin is isobutene.

6. The composition according to claim 2, wherein said polyolefin is a copolymer of propylene and butene.

7. A composition according to claim 2, wherein said polyolefin in a copolymer of olefins of from 9 to 20 carbon atoms.

8. A lubricating oil composition as described in claim 1, having from 6 to 50 mM. per kilogram of zinc O,O-dihydrocarbyl phosphorodithioate, wherein said hydrocarbyl group is from 4 to 36 carbon atoms.

References Cited

UNITED STATES PATENTS

| 2,236,168 | 3/1941 | Dietrich | 252—47.5 |
| 2,287,639 | 6/1942 | Pings | 252—47.5 |
| 2,367,468 | 1/1945 | Mixon et al. | 252—33 |

FOREIGN PATENTS

| 845,384 | 8/1960 | Great Britain. |
| 873,065 | 7/1961 | Great Britain. |

DANIEL E. WYMAN, *Primary Examiner.*

L. G. XIARHOS, *Assistant Examiner.*